United States Patent Office 3,398,106
Patented Aug. 20, 1968

3,398,106
TIN-CONTAINING CATALYST FOR
ISOCYANATE REACTIONS
Fritz Hostettler and Eugene F. Cox, Charleston, W. Va., assignors to Union Carbide Corporation, a corporation of New York
No Drawing. Filed Apr. 26, 1960, Ser. No. 24,650
1 Claim. (Cl. 260—18)

This invention relates to a new method for accelerating reactions involving organic compounds containing hydroxyl groups with organic compounds possessing reactive groups of the formula —NCY in which Y represents oxygen or sulfur.

Synthetic urethane products derived from reactions involving isocyanates and isothiocyanates with organic compounds containing hydroxyl groups, e.g., alcohols, polyoxyalkylene polyols, are rapidly becoming competitive with natural and synthetic rubbers. Urethane polymers are readily foamed by internal development of carbon dioxide or by means of a blowing agent to provide cellular urethane products of widely varying and preselected properties which find utility in the field of insulation, structural reinforcement, coatings, cushioning, encapsulation, and the like. Urethane foams offer the advantage of versatility in that they can be foamed in place to effect an obvious savings in labor and handling.

Catalysis of processes for the preparation of urethane foams has heretofore been effected by the use of a considerable number of materials which suffer one or more disadvantages. Strong bases such as sodium hydroxide frequently cause uncontrollable reactions and effect excess cross-linking. Tertiary amines, the conventional catalysts used in forming polyurethanes, require elevated temperatures and effect slow reaction rates unless used in unsatisfactorily large amounts. Tertiary amines often impart an undesirable odor to urethanes and have a further disadvantage in that they catalyze degradation of polymer products due to their basic characteristics.

The present invention is predictated on the finding that stannous octoate is ideally suited as a catalyst in accelerating reactions involving organic compounds containing one or more hydroxyl groups with organic compounds possessing one or more reactive groups of the formula —NCY in which Y represents oxygen or sulfur. Reaction rates that are obtainable with stannous octoate are higher than rates achieved with the tertiary amine catalysts heretofore proposed. Stannous octoate can be used in small concentrations; has no tendency to degrade a urethane polymer after it is formed; generally introduces no troublesome odor problem; and permits reactions at practicable and controllable rates without, in most instances, requiring heating of the reactants.

The ability of stannous octoate and other representative catalysts to accelerate reactions between organic compounds containing hydroxyl groups and organic compounds possessing reactive groups of the formula —NCY in which Y is oxygen or sulfur can be demonstrated by reacting phenyl isocyanate with methanol under essentially identical and controlled conditions. This reaction is important in the formation of polyurethanes by reaction of isocyanates with alcohols and polyoxyalkylene polyols. These tests were carried out in each instance by admixing equimolar amounts of phenyl isocyanate and methanol in n-butyl ether solvent, adding a different catalyst to the mixture, and observing the rate of reaction at 30° C. The reaction, catalyst and relative rates based on one mole percent of catalyst per mol of isocyanate are shown below.

(I) 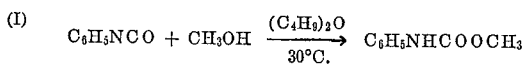

| Catalyst: | Relative rate |
| --- | --- |
| None | 1 |
| p-Toluenesulfonic acid | 2 |
| Acetic acid | 3 |
| N-methylmorpholine | 2.8 |
| Triethylamine | 11 |
| Triphenylamine | 1.5 |
| Stannous octoate | 13 |

The above data indicates that stannous octoate is more effective in accelerating hydroxyl-isocyanate reactions than N-methylmorpholine, a catalyst frequently used in the production of urethanes.

The stannous octoate catalyst can be effectively used in the preparation of a wide variety of polyurethanes derived from the reaction of isocyanates with organic compounds containing one or more hydroxyl groups. The hydroxyl-containing materials are aliphatic alcohols containing at least one, and preferably two or more hydroxyl groups such as methanol, ethylene glycol, diethylene glycol, hexamethylene glycol, glycerol, 1,2,6-hexanetriol, sorbitol, and the like.

The catalyst of the invention is particularly suitable for reaction of organic polyisocyanates with high molecular weight polymers having at least two end groups containing reactive hydrogen. A preferred class of such polymers includes polyoxylalkylene polyols. These are long chain polyols containing one or more chains of connected oxyalkylene groups. Most desirably, these polyoxyalkylene polyols are liquids having an average molecular weight in the range of 250 to 8000.

Examples of these polyoxyalkylene polyols include polypropylene glycols having average molecular weights of 250 to 8000, and reaction products of propylene oxide with linear diols and higher polyols, said higher polyols when employed as reactants giving rise to branched polyoxyalkylene polyols; and ethylene oxide-propylene oxide copolymers having average molecular weights of 250 to 5000 and in which the weight ratio of ethylene oxide to propylene oxide ranges between 10:90 and 90:10, including reaction products of mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols include glycerol, trimethylolpropane, 1,2,6-hexanetriol, pentaerythritol and sorbitol.

Another class of polyoxyalkylene polyols are the so-called block copolymers having a continuous chain of one type of oxyalkylene linkage connected to blocks of another type of oxyalkylene linkage. Examples of such block copolymers are reaction products of polypropylene glycols having average molecular weights of 250 to 5000 with an amount of ethylene oxide equal to 5 to 25% by weight of the starting polypropylene glycol. Another class of such block copolymers is represented by the corresponding reaction products of propylene oxide with polyethylene glycols.

Further examples of the class of polyoxyalkylene polyols include polyethylene glycols, polybutylene glycols and copolymers, such as polyoxyethyleneoxybutylene glycols and polyoxypropyleneoxybutylene glycols. Included in the term "polybutylene glycols" are polymers of 1,2-butylene oxide, 2,3-butylene oxide and 1,4-butylene oxide.

The terms "isocyanate" and "isothiocyanates" are used herein to refer to mono-and polyisocyanates and to mono- and polyisothiocyanates, respectively, including particularly diisocyanates and diisothiocyanates. While the invention has been described specifically with reference to the reaction of a certain monoisocyanate, it is generally applicable to the reaction of any compound containing one or more —N=C=Y groups in which Y is oxygen or sulfur. Compounds within this generic definition include monoisocyanates and monoisothiocyanates of the general formula

RNCY in which R is a hydrocarbon or substituted hydrocarbon radical such as alkyl, cycloalkyl, alkenyl, alkynyl, aralkyl, aryl, alkaryl, or a substituted analogue thereof. Examples of such compounds include methyl isocyanate, ethyl isocyanate, butyl isocyanate, octyl isocyanate, octadecyl isocyanate, vinyl isocyanate, isopropenyl isocyanate, ethynyl isocyanate, benzyl isocyanate, phenyl isocyanate, vinylphenyl isocyanate, tolyl isocyanate, ethyl isothiocyanate and phenyl isothiocyanate. Also included are polyisocyanates and polyisothiocyanates of the general formula R(NCY)$_x$ in which $x$ is two or more and R can be alkylene, substituted alkylene, arylene, substituted arylene, a hydrocarbon or substituted hydrocarbon containing one or more aryl-NCY bonds and one or more alkyl-NCY bonds, a hydrocarbon or substituted hydrocarbon containing a plurality of either aryl-NCY or alkyl-NCY bonds. R can also include radicals such as —R—Z—R— where Z may be any divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-menthane, xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane - 4,4',4" - triisocyanate, xylylene-alpha, alpha'-diisothiocyanate, and isopropylbenzene-alpha,4-diisocyanate.

Further included are dimers and trimers of isocyanates and diisocyanates and polymeric diisocyanates of the general formulae (RNCY)$_x$ and [R(NCY)$_x$]$_y$ in which $x$ and $y$ are two or more, as well as compounds of the general formula M(NCY)$_x$ in which $x$ is one or more and M is a monofuctional or polyfunctional atom or group. Examples of this type include ethylphosphonic diisocyanate, C$_2$H$_5$P(O) (NCO)$_2$; phenylphosphonous diisocyanate, C$_6$H$_5$P(NCO)$_2$; compounds containing a ≡Si—NCY group, isocyanates derived from sulfonamides (RSO$_2$NCO), cyanic acid, thiocyanic acid, and compounds containing a metal-NCY group such as tributyltin isocyanate.

In carrying out the method of the invention the stannous octoate catalyst may be added to the hydroxyl-containing compound, the isocyanate, or to a mixture of the same. The mixture is then foamed in the presence of the catalyst by internal development of carbon dioxide or by means of a blowing agent which vaporizes at or below the temperature of the foaming mass. As a general guide, the stannous octoate is used in a catalytically significant amount ranging from about 0.005 to 5%, preferably 0.05 to 1.0%, by weight, based on the total weight of the reaction mixture.

The preparation of urethane foams can be carried out by forming a prepolymer, i.e., prereacting molar equivalents of the hydroxyl compound and isocyanate in the absence of water and thereafter producing a foam by the addition of excess isocyanate, catalyst, water and surfactant; by the one-shot method in which the hydroxyl compound, blowing agent, and isocyanate reactants are simultaneously mixed together and allowed to react in the presence of the catalyst; or by the semiprepolymer technique wherein the hydroxyl reactant is partially extended with excess isocyanate to provide a reaction product containing a high percentage of free isocyanate groups (20–35%) which is then foamed at a later stage by reaction with additional hydroxyl compound, a blowing agent and catalyst.

The amount of isocyanate used in the preparation of flexible, rigid or semirigid foams should be such that there is more than the theoretical amount required to form a urethane linkage, —NHCO—O—, in the polymer resulting from reaction of the isocyanate with the active hydrogens of the hydroxyl-containing compound. The amount of isocyanate employed generally ranges from about 1.0 to 7 equivalents, preferably 2 to 6 equivalents, per equivalent of hydroxyl compound.

The reaction of excess diisocyanate with a hydroxyl-containing compound such as a polyoxypropylene glycol produces a polymer having terminal isocyanate groups as illustrated by the equation:

excess OCN—R—NCO + HO(C$_2$H$_4$O)$_n$H ⟶
OCN—R[NH—CO—O—(C$_2$H$_4$O)$_n$—C$_2$H$_4$—O—CONHR]$_x$NCO in which R represents an aliphtaic, cycloaliphatic or aromatic diisocyanate residue exclusive of reactive isocyanate groups (—NCO), $x$ is an integer greater than 1 and $n$ is an integer such that the molecular weight of the ether glycol is at least 250. When it is desired to form a foam, the mixture of the isocyanate-modified polyether reacts through the isocyanate groups with a chain extending agent containing active hydrogen, e.g., water, in the presence of the stannous octoate catalyst. This involves several reactions that proceed simultaneously including the reaction between the isocyanate groups and water to form urylene links (—NHCONH—) and carbon dioxide, as well as the reaction of the urylene links so formed with unreacted isocyanate groups to form biuret cross links. Depending upon the desired density of the urethane foam and the amount of cross linking desired, the total —NCO equivalent to total active hydrogen equivalent should be such as to provide a ratio of 0.8 to 1.2 equivalents of —NCO per equivalent of active hydrogen and preferably a ratio of about 0.9 to 1.1 equivalents.

The foaming operation also can be effected by means of a blowing agent, such as a low boiling, high molecular weight gas, which vaporizes at or below the temperature of the foaming mass. In rigid foams intended for use in the field of insulation and structural reinforcement the incorporation of a gas lowers its heat conductivity. If a fluorocarbon gas such as trichloromonofluoromethane, "Ucon 11," is used in blowing rigid foams, a lower K-factor is obtained than in rigid foams of equal density blown with air or carbon dioxide. The reactions that occur during this type operation include formation of the urethane linkage as well as the formation of isocyanate dimers and trimers. In addition, another reaction that can occur is the formation of allophanate structures.

Preferred blowing agents are the fluorocarbons such as trichloromonofluoromethane; dichlorodifluoromethane, dichlorofluoromethane, 1,1-dichloro-1-fluoroethane; 1-chloro - 1,1 - difluoro, 2,2-dichloroethane; and 1,1,1-trifluoro, 2-chloro - 2 - fluoro, 3,3-difluoro, 4,4,4-trifluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lbs. per cubic foot. If desired, water may be used in conjunction with the blowing agent.

It is to be expected that numerous modifications will readily become apparent to those skilled in the art upon reading this description. All such modifications are intended to be included within the scope of the invention as defined in the appended claim.

What is claimed is:

1. A process for producing a urethane which comprises reacting
   (a) a compound having at least one isocyanato group with
   (b) a compound having at least one alcoholic hydroxyl group, in the presence of a catalytic amount of stannous octoate, wherein the sole reactive groups present in both said compounds are isocyanato and aliphatic alcoholic hydroxyl groups, respectively.

References Cited

UNITED STATES PATENTS

| | | | |
|---|---|---|---|
| 3,010,923 | 11/1961 | Ikeda | 260—77.5 |
| 2,374,136 | 4/1945 | Rothrock | 260—77.5 |

OTHER REFERENCES

"Varnish Constituents," Chatfield, 1953, Leonard Hill Ltd., pp 553 and 571, TP 938 c53.

"Organic Coating Technology," vol. 1, Payne, 1954, Wiley and Sons Inc., p. 229; TP 935 P38.

Modern Plastics, February 1960; p. 53, TP 986 A1M6. (Copy in Scientific Library.)

Technical Information Bulletin, No. 24–F8, Apr. 27, 1959, Mobay Chemical Co., Pittsburgh, Pa.

Technical Information Bulletin, No. 28–F9, July 20, 1959, Mobay Chemical Co., Pittsburgh, Pa.

Technical Information Bulletin, No. 34–F11, Nov. 25, 1959, Mobay Chemical Co., Pittsburgh, Pa.

Technical Information Bulletin, No. 36–F13, Nov. 25, 1959, Mobay Chemical Co., Pittsburgh, Pa.

DONALD E. CZAJA, *Primary Examiner.*

F. McKELVEY *Assistant Examiner.*